R. L. TRIPLETT.
ELECTRICAL MEASURING INSTRUMENT.
APPLICATION FILED NOV. 28, 1910.
1,072,531.
Patented Sept. 9, 1913.
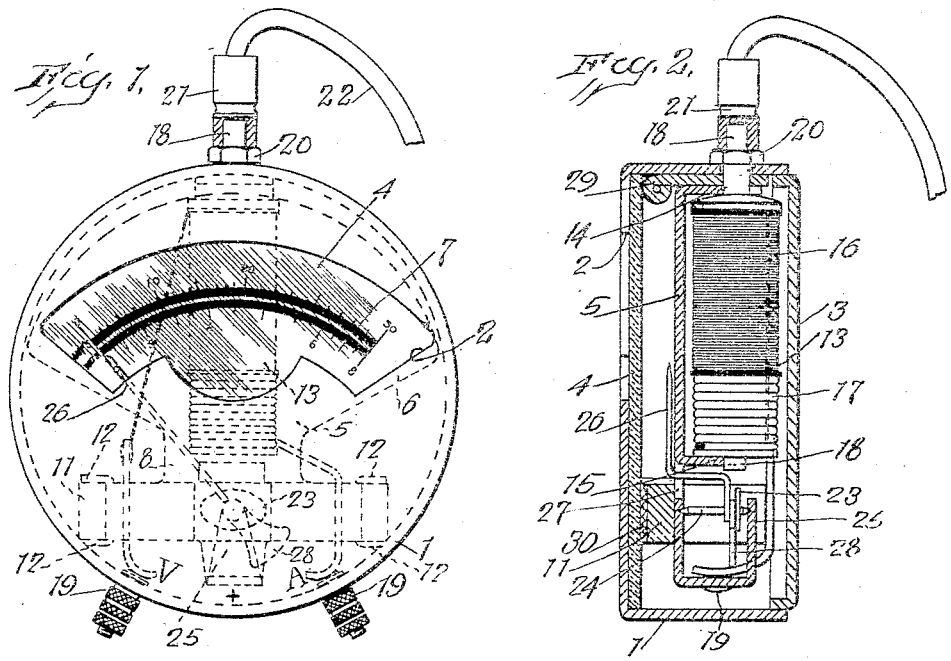
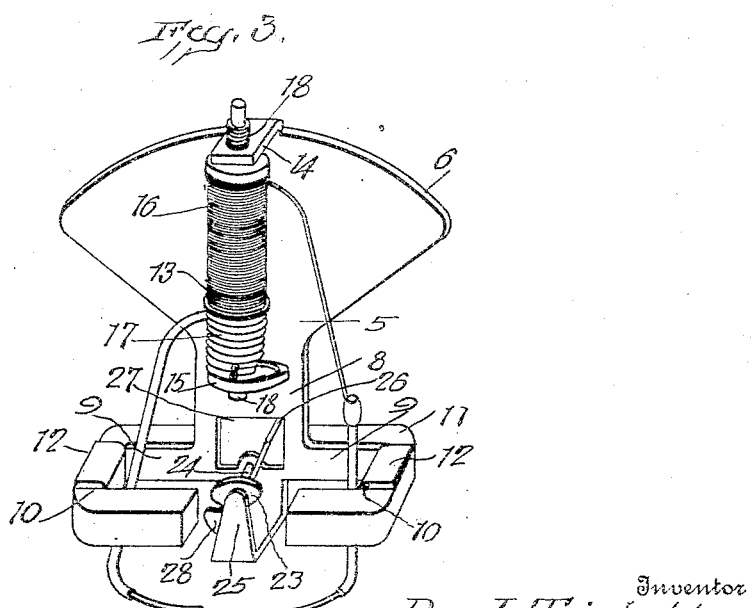
Witnesses
G. Howard Uhlmely
Edward T. Reed
Inventor
Ray L. Triplett,
By H. A. Toulmin
Attorney

UNITED STATES PATENT OFFICE.

RAY L. TRIPLETT, OF BLUFFTON, OHIO, ASSIGNOR, BY MESNE ASSIGNMENTS, TO THE DILLER MANUFACTURING COMPANY, OF BLUFFTON, OHIO, A CORPORATION OF OHIO.

ELECTRICAL MEASURING INSTRUMENT.

1,072,531. Specification of Letters Patent. Patented Sept. 9, 1913.

Application filed November 23, 1910. Serial No. 594,452.

*To all whom it may concern:*

Be it known that I, RAY L. TRIPLETT, a citizen of the United States, residing at Bluffton, in the county of Allen and State of Ohio, have invented certain new and useful Improvements in Electrical Measuring Instruments, of which the following is a specification, reference being had therein to the accompanying drawings.

This invention relates to electrical measuring instruments, and more particularly to ammeters and voltmeters of the pocket type. Instruments of this character comprise an indicating device, such as a needle arranged to travel over a scale, the action of which is controlled by two magnets, a permanent magnet and an electro-magnet. The relative positions occupied by the magnets affect the action of the indicating device, and, as the instruments are usually assembled, the relative positions of the magnets will vary in different instruments and it has been customary to provide each instrument with a special scale, the preparation of which required various tests and adjustments and added materially to the labor and cost of manufacturing the instruments.

The object of this invention is to provide means whereby the several active parts of the instrument, more particularly the magnets, may be assembled in fixed and predetermined relative positions, thereby enabling a fixed scale to be employed for all instruments of the same type with the assurance that it will correspond exactly to the actual registration of each instrument.

To this end it is a further object of the invention to provide a supporting member having means for securing thereto the active parts of the instrument, each in a predetermined position.

A further object of the invention is to so construct and arrange the permanent magnet as to provide more space for the electro-magnet, thereby enabling the latter to be made larger and more efficient without increasing the size of the instrument.

It is also an object of the invention to so arrange the magnets that the electro-magnet may be supported entirely outside of the permanent magnet and that the lead wires may be passed through the permanent magnet without coming in contact therewith, thus eliminating the necessity for further insulation.

In the accompanying drawings, Figure 1 is a front elevation of a combined voltmeter and ammeter embodying my invention; Fig. 2 is a vertical, sectional view taken centrally of the instrument shown in Fig. 1; and Fig. 3 is a detail view of the supporting member, showing the several parts mounted thereon.

In these drawings I have illustrated one embodiment of the invention and have shown the same as a combined ammeter and voltmeter. The several parts of the instrument are mounted within a casing 1, preferably in the form of a cylinder and provided in its front face with a sight opening 2 and having its opposite end closed by a removable closure 3. The sight opening 2 is closed by a plate of glass or other transparent material, as indicated at 4, and this plate is preferably circular in form and of a diameter substantially equal to the interior diameter of the cylindrical casing. Mounted within the casing is a suitable supporting member upon which are arranged the two magnets which control the indicating device. This member may be of any suitable character and is here shown as comprising a plate 5 having a sector-like upper portion 6 extending across the sight opening 2 and supporting a scale 7. This scale is here shown as a double scale, one scale reading in amperes and the other in volts to accommodate the same to the double capacity of the instrument. The plate 5 has a reduced portion 8 extending downwardly from the sector-like upper portion 6 and provided at its lower end with laterally extending arms 9 having their outer ends bent at an angle to the supporting member to form lugs 10, which preferably extend rearwardly therefrom. These lugs form connecting devices, by means of which the permanent magnet, indicated at 11, is supported in a fixed and predetermined position. This magnet is preferably formed from a bar of metal of any character which is capable of being highly magnetized and is substantially C- shaped, having its poles arranged on the opposite sides of a central vertical line extending parallel with the supporting plate. This C-shaped magnet extends about the plate 5, the arms 9 and the lugs 10 and is supported in a plane extending transversely to the supporting member 5 and is rigidly secured to the lugs and the plate by suitable fastening devices, such as lips 12, extending from the upper and lower edges of the lugs 10 and compressed tightly on the upper and lower edges of the adjacent portions of the magnet to clamp the same firmly in position.

The electro-magnet, which is indicated at 13, is arranged at substantially right angles to the plane of the permanent magnet and has that end adjacent the permanent magnet spaced away from said permanent magnet so that the electro-magnet is entirely outside of the permanent magnet. The plate 5 is also provided with suitable connecting devices for supporting the electro-magnet in its proper relation to the permanent magnet. In the present instance the upper portion of the plate 5 is provided with portions extending at an angle thereto and forming lugs 14 and 15 between which the coil is mounted, these lugs being arranged in a line extending at substantially right angles to the plane of the permanent magnet. In the present instance the electro-magnet is a double magnet comprising a coil of fine resistance wire, as indicated at 16, for use in measuring voltage, and a second coil, 17, of heavy conducting wire for use in measuring amperage. These coils are mounted upon a rod or stem 18 and each has one end connected with said rod and the other end extending downwardly through the C-shaped permanent magnet and connected with suitable contact posts 19 carried by the casing 1. These contact posts may be of any suitable character, but are here shown as binding posts of ordinary construction which may be placed in direct contact with the terminal of the cell or other source of electricity, which it is desired to test, or may have connected thereto a conductor leading to a source of electrical supply. These binding posts extend through the circumferential portion of the cylindrical casing, are insulated therefrom and have their inner ends exposed to form contact points with which the lead wires from the two windings of the electro-magnet are connected. This connection is preferably made by bringing the lead wire in contact with the end of the binding post and soldering the same thereto, thereby avoiding any possibility of accidental displacement of the lead wire and the breaking of the circuit. The manner of making this connection is, however, optional. It will be noted that the lead wires extend through the space within the permanent magnet without coming in contact therewith and, therefore, it is unnecessary to provide any additional or special insulation for these lead wires.

The electro-magnet 13 may be mounted on the fastening devices 14 and 15 in any suitable manner. As here shown the rod or stem 18 projects above and below the respective ends of the magnet. The upper connecting device or lug 14 is provided with an aperture through which the adjacent end of the rod is inserted and the lower connecting device or lug 15 is provided with a slot adapted to receive the adjacent end of the rod 18. The positions of the two connecting devices with relation to the length of the magnet are such that the magnet must be sprung into position by force and the resiliency of the connecting devices will then retain the magnet in position. The rod 18 extends through the circumferential wall of the casing 1 and has screw-threaded thereon a nut 20 by means of which the supporting plate and the several active parts carried thereby are firmly secured within the casing. The end of the rod extends above the nut 20 and forms a contact pin to receive a socket 21 of a flexible conductor 22 adapted to be connected with one terminal of the source of electrical supply. Thus, it will be noted that the rod or stem 18 has three functions. First, it supports the electro-magnet upon the plate 5; second, it secures the supporting plate and the parts carried thereby to the casing, and third, it forms a direct connection between the conductor 22 and the two windings of the electro-magnet.

The indicating device, which coöperates with the scale 7 and which is controlled by the two magnets, comprises a vane 23 which preferably consists of an elongated plate of soft iron mounted upon a pintle 24, one end of which is mounted in the plate 5, preferably between the arms 9, and the other end of which is mounted in a supporting lug 25. To form this supporting lug the plate 5 is preferably provided with a downwardly extending finger which is bent outwardly and then upwardly, as indicated in the drawings. A needle 26 is connected with the vane 23 and moves therewith when the latter is moved about its axis. This needle extends through an opening 27 in the plate 5 and upward in front of the plate to a point near the scale 7, across which it travels when the vane is actuated. A counterweight 28 is also connected with the vane. This vane is arranged within the field of the permanent magnet and extends substantially parallel with the lines of force passing between the two poles. When neither of the windings of the electro-magnet is energized the vane will extend in a line substantially parallel with the plane of the magnet. When either coil of the electro-magnet is energized the electro-magnet will attract one pole of the permanent magnet and repel the other pole thereof, thus deflecting the field and causing the vane to move about its axis and carry the needle across the scale 7. On the face of the casing are two indications, such as the letters V and A, arranged adjacent to the two binding posts 19. The letter V indicates the binding post which is connected with the fine winding of the electro-magnet and that when this binding post is connected with the source of electrical supply the meter will indicate volts. The letter A is arranged adjacent to the other binding post 19 which is connected with the coarse winding of the electro-magnet and indicates that when this binding post is connected with the source of electrical supply the instrument will register amperes.

The glass 4, which closes the sight opening 2, is preferably held in position by the supporting plate 5, and, to this end, two cushioning devices are interposed between the supporting plate and the glass at widely separated points. One of these cushioning devices comprises a strip of resilient metal 29 having one end apertured and extending about the upper end of the stem 18 between the wall of the casing and the lug 14 and having that end adjacent the glass curved and bearing against the glass. The second cushioning device comprises a small strip of fiber or fabric 30 which is interposed between that portion of the permanent magnet lying in front of the supporting plate and the glass. When the nut 20 has been tightened down to fasten the supporting plate within the casing these two cushioning devices will be caused to bear against the glass and will hold the same firmly in position and prevent its rattling.

The supporting member or plate 5 may be of any suitable character, but for the sake of economy of manufacture and accuracy in the arrangement of the connecting devices it is preferable that it should be struck from sheet metal by the use of dies, and it will be apparent that these fastening devices are so arranged upon the plate that when the several active parts are assembled and secured to the plate they will be supported in fixed predetermined positions relatively both one to the other and to the scale carried by the plate. Consequently, it is possible to provide this scale on the plate by stamping or otherwise, and when each instrument is assembled the registration of the indicating device will correspond accurately with the scale, this being true because the magnets and the indicating device are arranged in fixed, predetermined positions. In this manner the necessity of testing and adjusting each instrument and providing a special scale therefor is eliminated and it is possible to produce the instruments at a much lower cost and with a higher degree of accuracy. It will also be apparent that by arranging the permanent magnet in a horizontal plane, that is, a plane extending transversely to the supporting member, and the electro-magnet at substantially right angles to the plane of the permanent magnet I am enabled to support the electro-magnet entirely outside of the permanent magnet and to form the electro-magnet larger and, therefore, more efficient than has been possible with constructions heretofore in use.

While I have herein shown and described the invention as applied to a combined voltmeter and ammeter it will be understood that the invention is applicable to various measuring instruments, and more especially that the construction here shown could be adapted to a voltmeter or an ammeter separately by providing the electro-magnet 13 with a single coil instead of the double coil here shown.

The particular form of indicating device is not a part of the present invention and the character of this indicating device may be widely varied without otherwise altering the construction of the device. Further, the character of the supporting member and the connecting devices, as well as their arrangement, may be varied should occasion arise. The essential characteristic of these connecting devices is that they are permanently connected with the supporting member, that is, they are secured in fixed positions thereon in such a manner that the parts to be connected to the supporting member can be secured to the connecting devices and will then occupy their proper relative positions. I, therefore, wish it to be understood that I do not desire to be limited to the details of construction shown and described, for obvious modifications will occur to a person skilled in the art.

Having thus fully described my invention, what I claim as new and desire to secure by Letters Patent, is:—

1. In an electrical measuring instrument, the combination, with a plurality of active parts, of a single supporting member, and connecting devices formed integral with said supporting member to engage the respective active parts and support the same in predetermined positions relatively one to the other.

2. In an electrical measuring instrument, the combination, with a plurality of magnets, and an indicating device controlled by said magnets, of a single supporting member, connecting devices formed integral with said supporting member to engage said magnets and support the same in predetermined positions thereon.

3. In an electrical measuring instrument, the combination, with a plurality of magnets, and an indicating device controlled by said magnets, of a single supporting member, and connecting devices formed integral with said supporting member and adapted to engage the respective magnets and said indicating device to secure the same in predetermined positions on said supporting member.

4. In an electrical measuring instrument, the combination, with a plurality of magnets, and an indicating device controlled by said magnets, of a single supporting member, and connecting devices formed integral with said supporting member to secure said magnets in predetermined positions thereon.

5. In an electrical measuring instrument, the combination, with a plurality of magnets, and an indicating device controlled by said magnets, of a supporting plate of sheet metal having lugs struck therefrom forming connecting devices to engage the respective magnets and secure the same in predetermined positions thereon.

6. In an electrical measuring instrument, the combination, with a plurality of magnets, and an indicating device controlled by said magnets, of a supporting plate of sheet metal having lugs struck therefrom forming connecting devices to engage the respective magnets and said indicating device, and support said magnets in predetermined positions relatively to said indicating device.

7. In an electrical measuring instrument, the combination, with a plurality of magnets, and an indicating device controlled by said magnets and comprising a needle, of a supporting plate having a scale on the front side thereof, having lugs projecting from the rear side thereof to support said magnets in predetermined positions relatively one to the other and having another lug to support said indicating device in a predetermined position relatively to said magnet and said scale, said plate having an opening through which said needle extends.

8. In an electrical measuring instrument, the combination, with a permanent magnet, an electro-magnet, and an indicating device controlled by said magnets, of a supporting plate having lugs near the opposite edges thereof to support said permanent magnet and having other lugs arranged in a line extending substantially at right angles to the line of the first-mentioned lugs and adapted to support said electro-magnet.

9. In an electrical measuring instrument, a supporting plate comprising a sector-like upper portion having parts turned at an angle thereto to form lugs, a reduced portion extending downward from said upper portion, and laterally extending arms carried by said reduced portion and having their ends turned at angles thereto to form lugs.

10. In an electrical measuring instrument, a supporting member, a permanent magnet mounted on said supporting member in a plane extending transversely thereto, an electro-magnet mounted on said supporting member and having its axis arranged at substantially right angles to the plane of said permanent magnet, and an indicating device mounted on said supporting member and controlled by said magnets.

11. In an electrical measuring instrument, a plate carrying a scale, a C-shaped magnet supported on said plate in a plane extending transversely thereto, an electro-magnet supported on said plate with its axis arranged at substantially right angles to the plane of said C-shaped magnet and having that end near said magnet spaced away therefrom.

12. In an electrical measuring instrument, a casing, a supporting member mounted within said casing, a permanent magnet carried by said supporting member, an electro-magnet carried by said supporting member and having a stem which extends through the wall of said casing, and means for securing said stem to said casing.

13. In an electrical measuring instrument, a casing, a supporting member mounted within said casing, a permanent magnet carried by said supporting member, an electro-magnet carried by said supporting member and having a rod electrically connected thereto and extending through the wall of said casing, and a nut mounted on said rod to secure the same to said casing, said rod extending beyond said nut to provide a contact point for connection with a source of electrical supply.

14. In an electrical measuring instrument, a casing, a supporting plate mounted in said casing, and having connecting lugs, a permanent magnet mounted on said supporting plate, an electro-magnet having a stem supporting it and electrically connected thereto, said stem extending through one of said lugs and through and beyond the wall of said casing, and means for securing said stem to said casing, whereby said stem serves to connect said electro-magnet to said supporting plate to secure said supporting plate to said casing and provides an external contact point directly connected with the winding of said electro-magnet.

15. In an electrical measuring instrument, a casing having a sight opening, a plate of glass extending across said sight opening, a supporting plate mounted within said casing, a plurality of magnets carried by said supporting plate, cushioning devices arranged between said supporting plate and said glass, and means for securing said supporting plate within said casing.

16. In an electrical measuring instrument, a casing having a sight opening, a glass to close said opening, a supporting plate mounted within said casing, a spring arranged between one portion of said supporting plate and said glass, and a cushion arranged between another portion of said supporting plate and said glass.

In testimony whereof, I affix my signature in presence of two witnesses.

RAY L. TRIPLETT.

Witnesses:
　HENRY L. ROMEY,
　ALBERT BENRATH.